United States Patent
Takebe et al.

(10) Patent No.: US 9,027,018 B2
(45) Date of Patent: May 5, 2015

(54) DISPLAY TERMINAL, DISPLAYING METHOD, AND RECORDING MEDIUM

(75) Inventors: Akio Takebe, Kawasaki (JP); Kenichiro Shimogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 710 days.

(21) Appl. No.: 12/984,914

(22) Filed: Jan. 5, 2011

(65) Prior Publication Data

US 2011/0173611 A1    Jul. 14, 2011

(30) Foreign Application Priority Data

Jan. 12, 2010    (JP) .................................. 2010-004410

(51) Int. Cl.
G06F 9/455    (2006.01)
G06F 9/46     (2006.01)
G06F 3/0481   (2013.01)
G06F 3/048    (2013.01)

(52) U.S. Cl.
CPC .......... G06F 9/45545 (2013.01); G06F 3/0481 (2013.01); G06F 3/048 (2013.01)

(58) Field of Classification Search
CPC .... G06F 9/45545; G06F 3/0481; G06F 3/048
USPC ............................................ 718/1, 108, 100
See application file for complete search history.

(56) References Cited

U.S. PATENT DOCUMENTS

| | | | | |
|---|---|---|---|---|
| 5,956,515 A * | 9/1999 | Beals et al. | ................... | 717/170 |
| 6,202,206 B1 * | 3/2001 | Dean et al. | ................... | 717/177 |
| 7,516,206 B2 * | 4/2009 | Henseler et al. | ............... | 709/223 |
| 2003/0221190 A1 * | 11/2003 | Deshpande et al. | .......... | 717/171 |
| 2004/0088694 A1 * | 5/2004 | Ho | ................................ | 717/170 |
| 2010/0218140 A1 * | 8/2010 | Feke et al. | ..................... | 715/810 |
| 2011/0099545 A1 * | 4/2011 | Lee et al. | ...................... | 717/172 |

FOREIGN PATENT DOCUMENTS

| | | |
|---|---|---|
| JP | 5-197575 A | 8/1993 |
| JP | 6-242913 A | 9/1994 |
| JP | 2000-075904 A | 5/2000 |
| JP | 2001-229108 A | 8/2001 |

OTHER PUBLICATIONS

Machine Translation JP 2001229108 A.*
Japanese Office Action mailed Jun. 4, 2013 for corresponding Japanese Application No. 2010-004410, with Partial English-language Translation.

* cited by examiner

*Primary Examiner* — Emerson Puente
*Assistant Examiner* — Willy W Huaracha
(74) *Attorney, Agent, or Firm* — Fujitsu Patent Center

(57) ABSTRACT

A master selecting unit selects master software from pieces of software that perform a computing process. A screen control unit displays an operation screen for the master software that is selected by the master selecting unit on a screen. A software search unit searches, when an instruction operation is detected on the operation screen for the master software, for any piece of software that displays an operation screen that receives the same instruction operation that the operation screen for the master software receives. An operation-content instructing unit instructs the master software and each piece of software that is found by the software search unit about operation content corresponding to the instruction operation that has been detected on the operation screen for the master software.

7 Claims, 13 Drawing Sheets

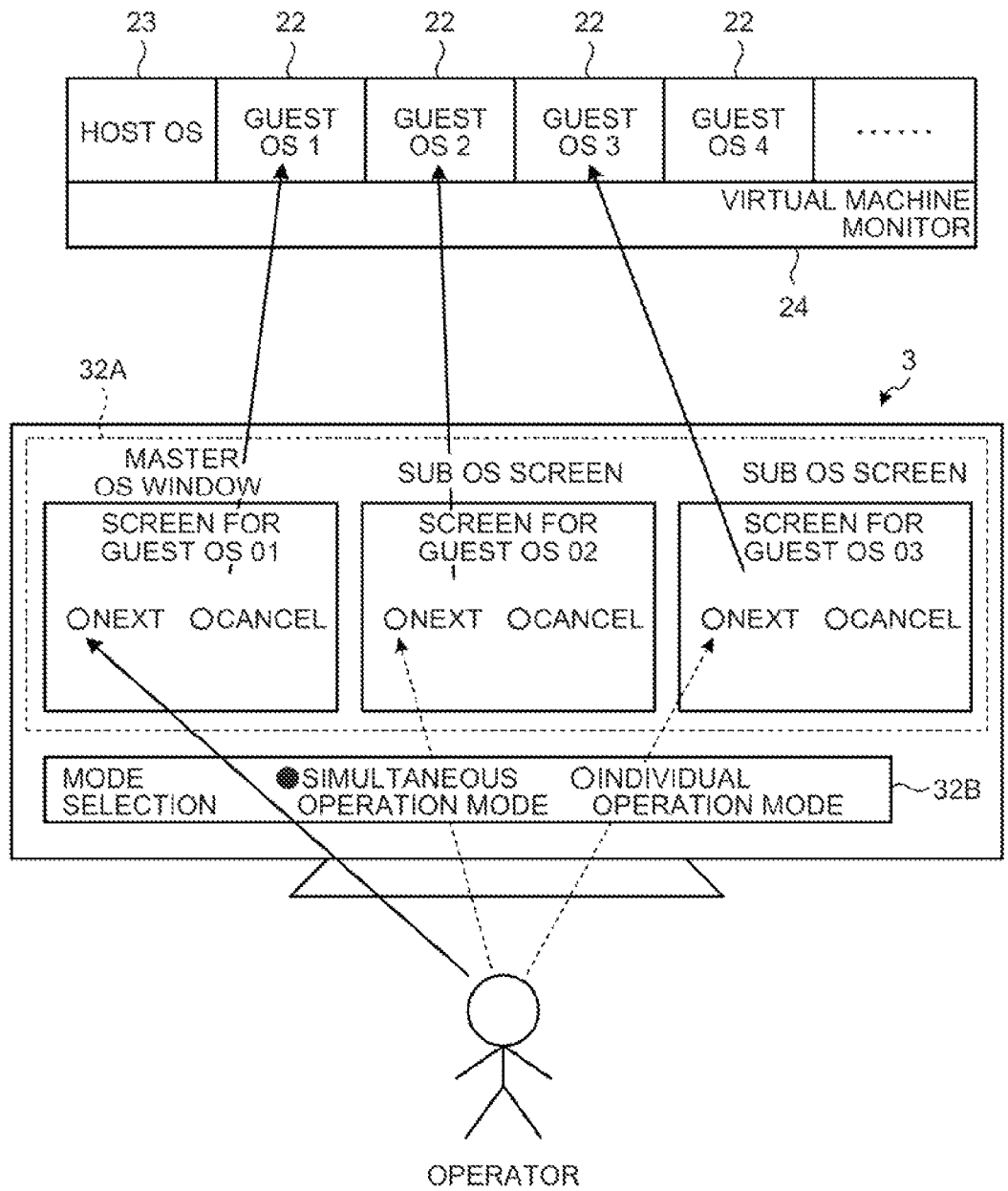

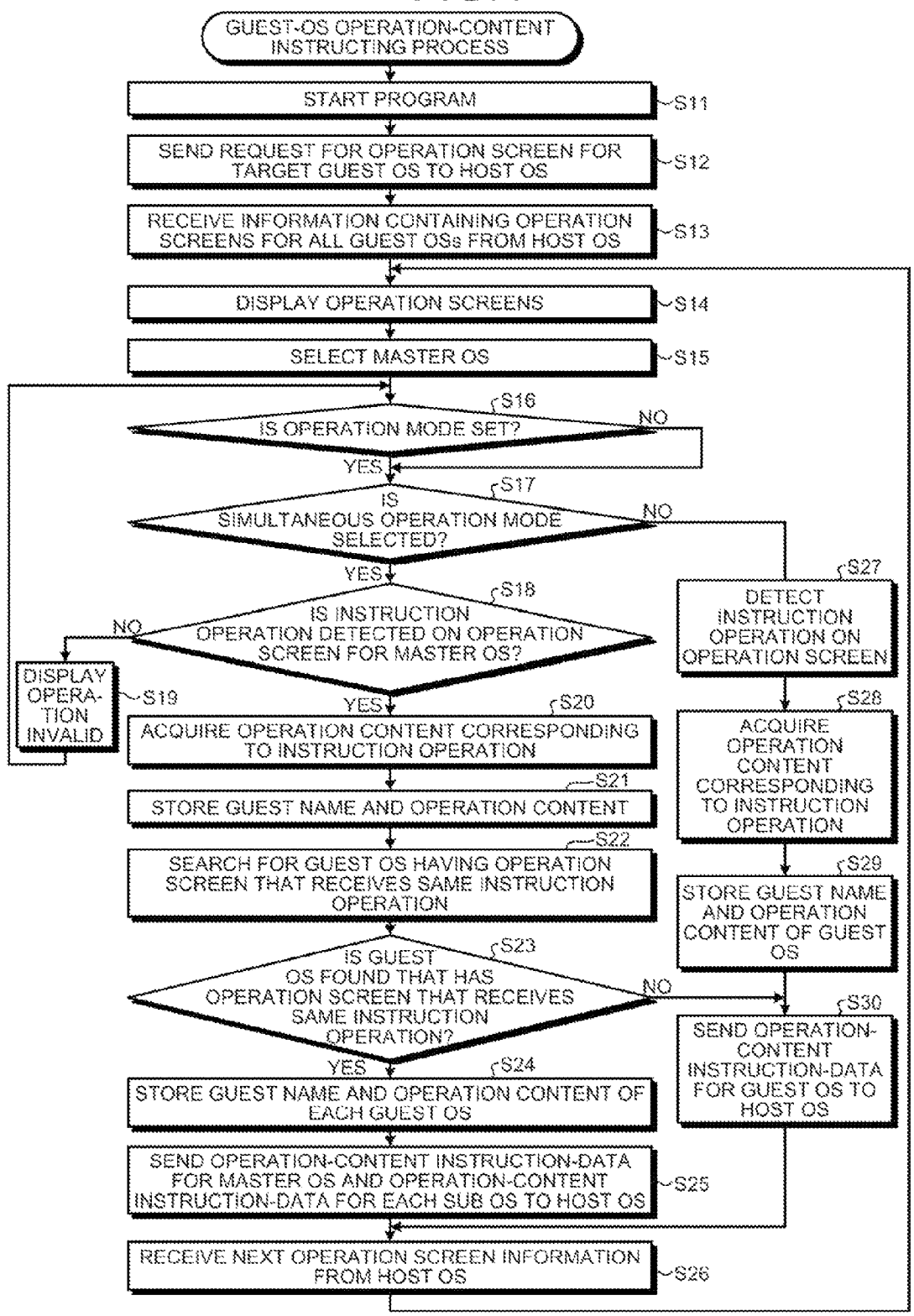

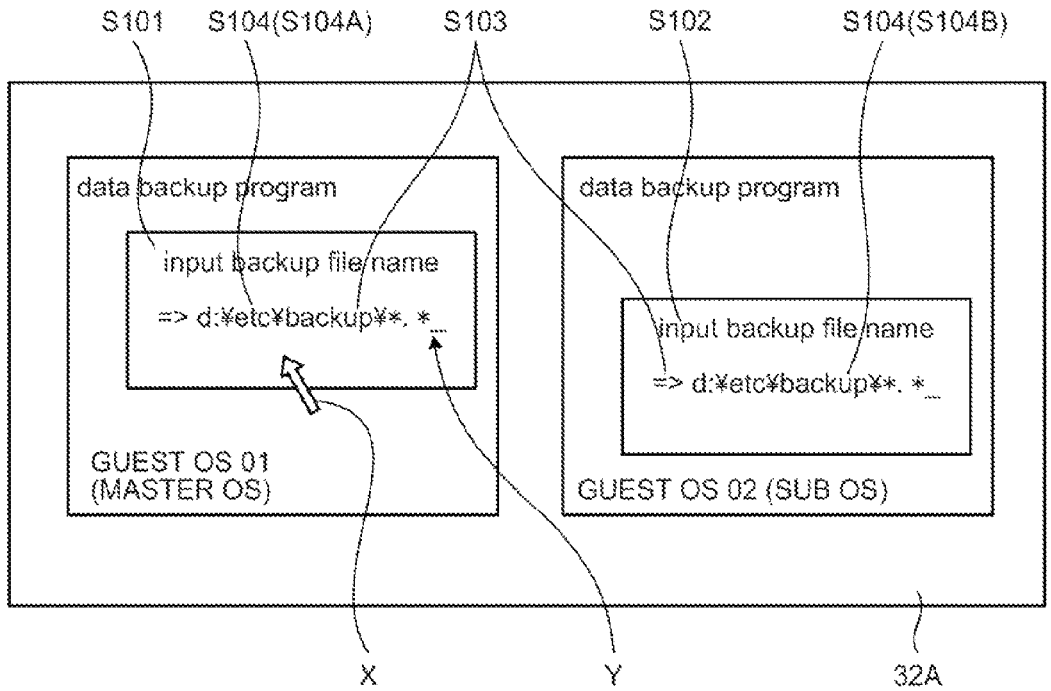

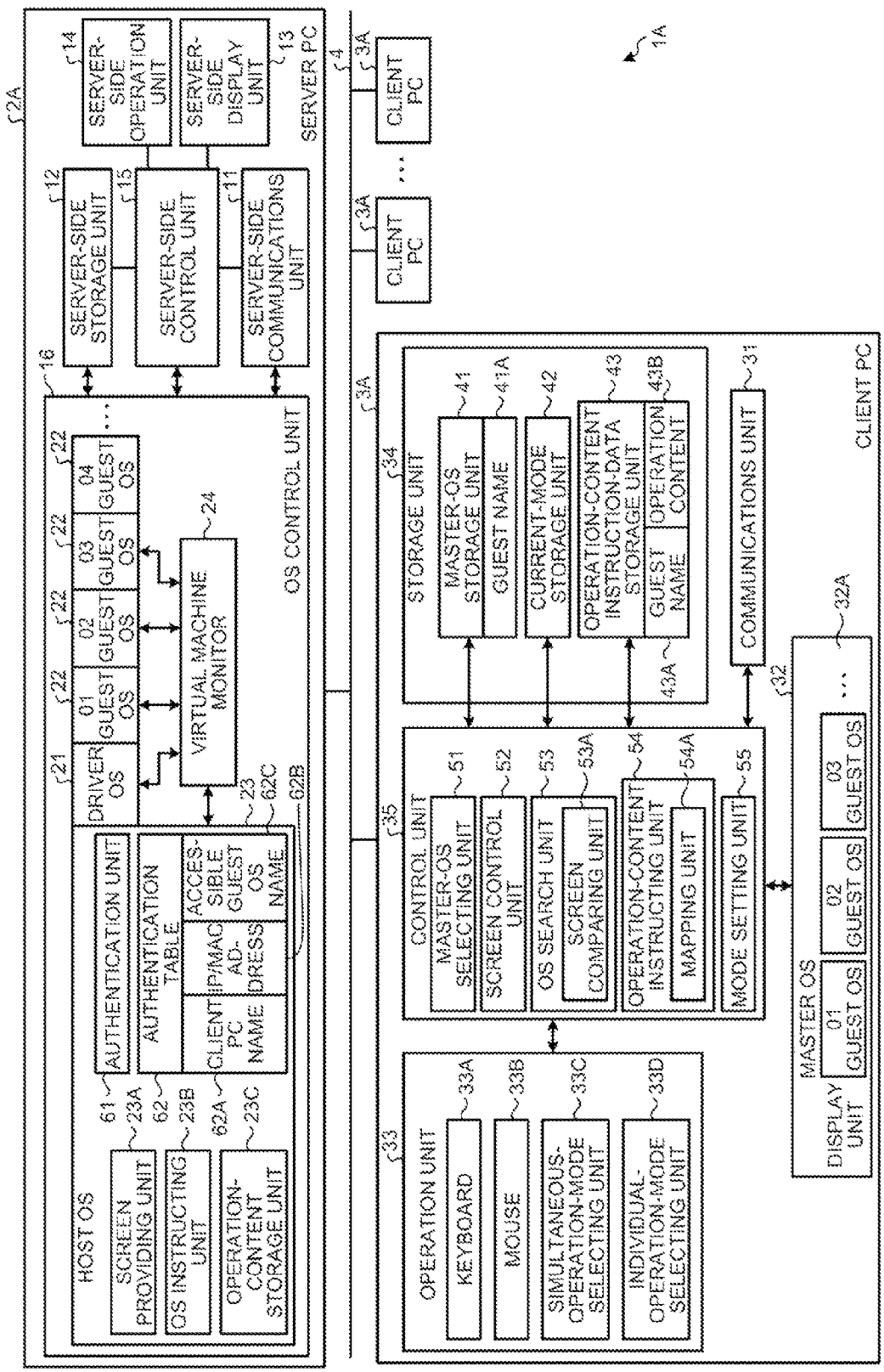

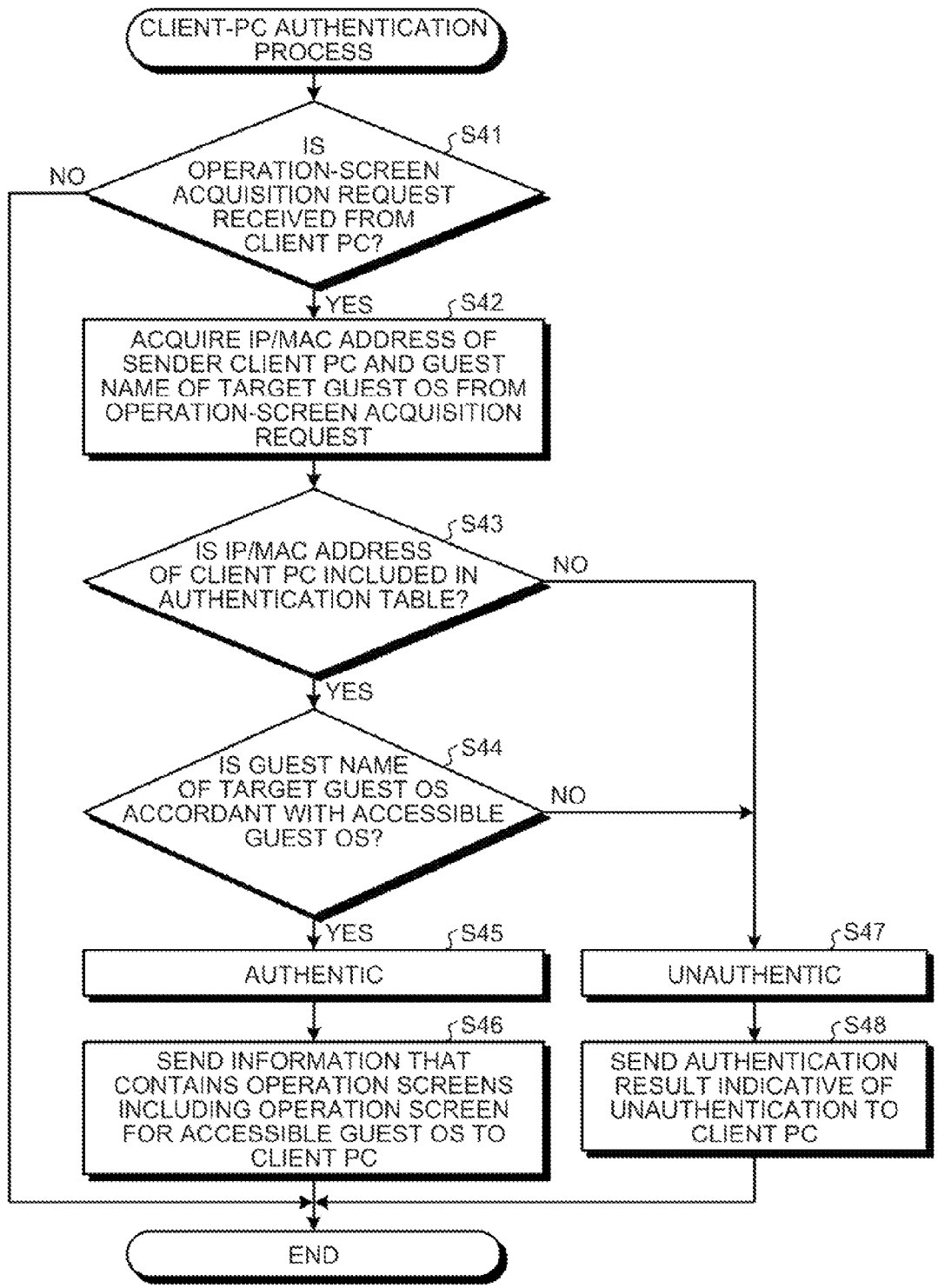

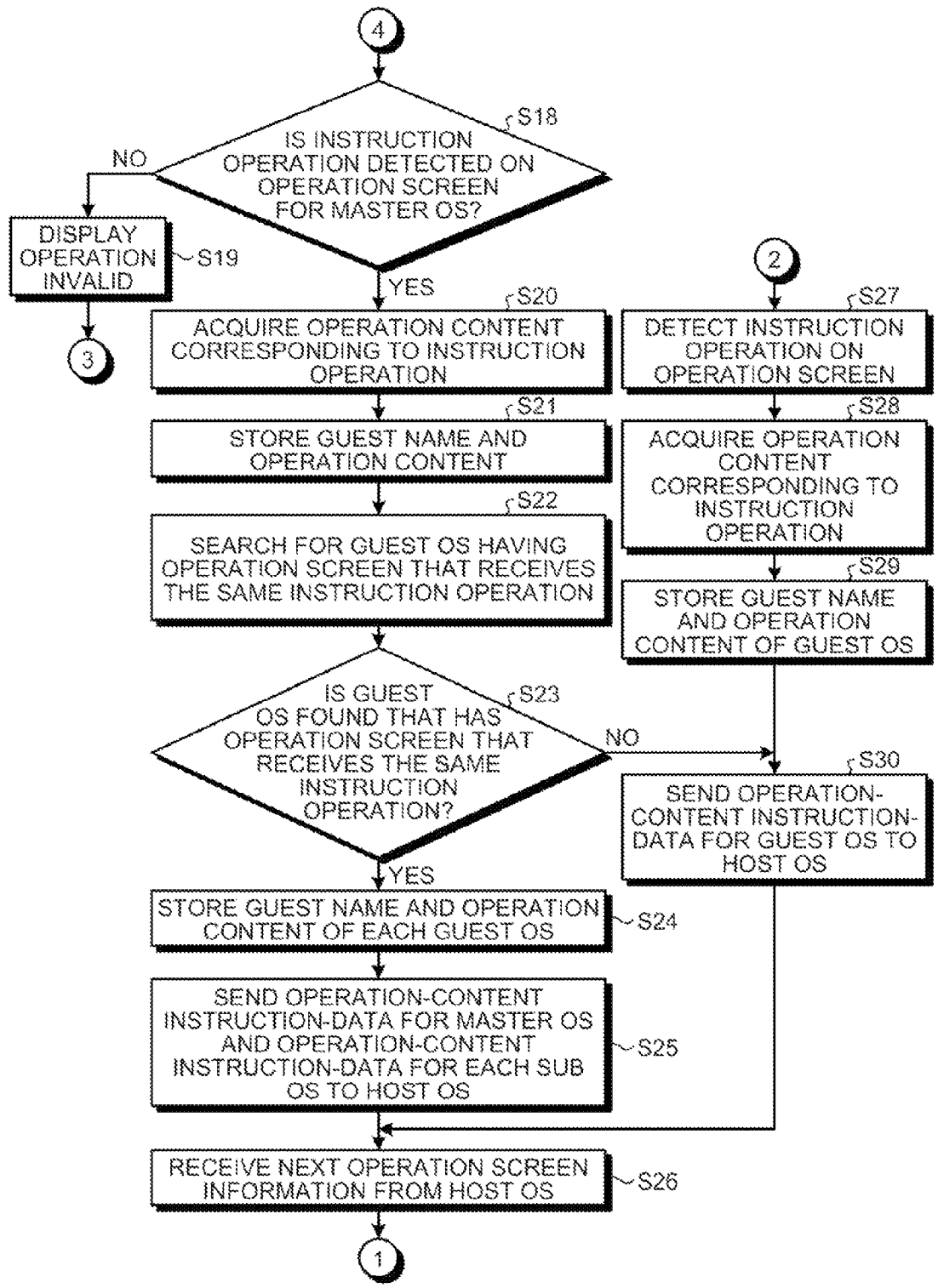

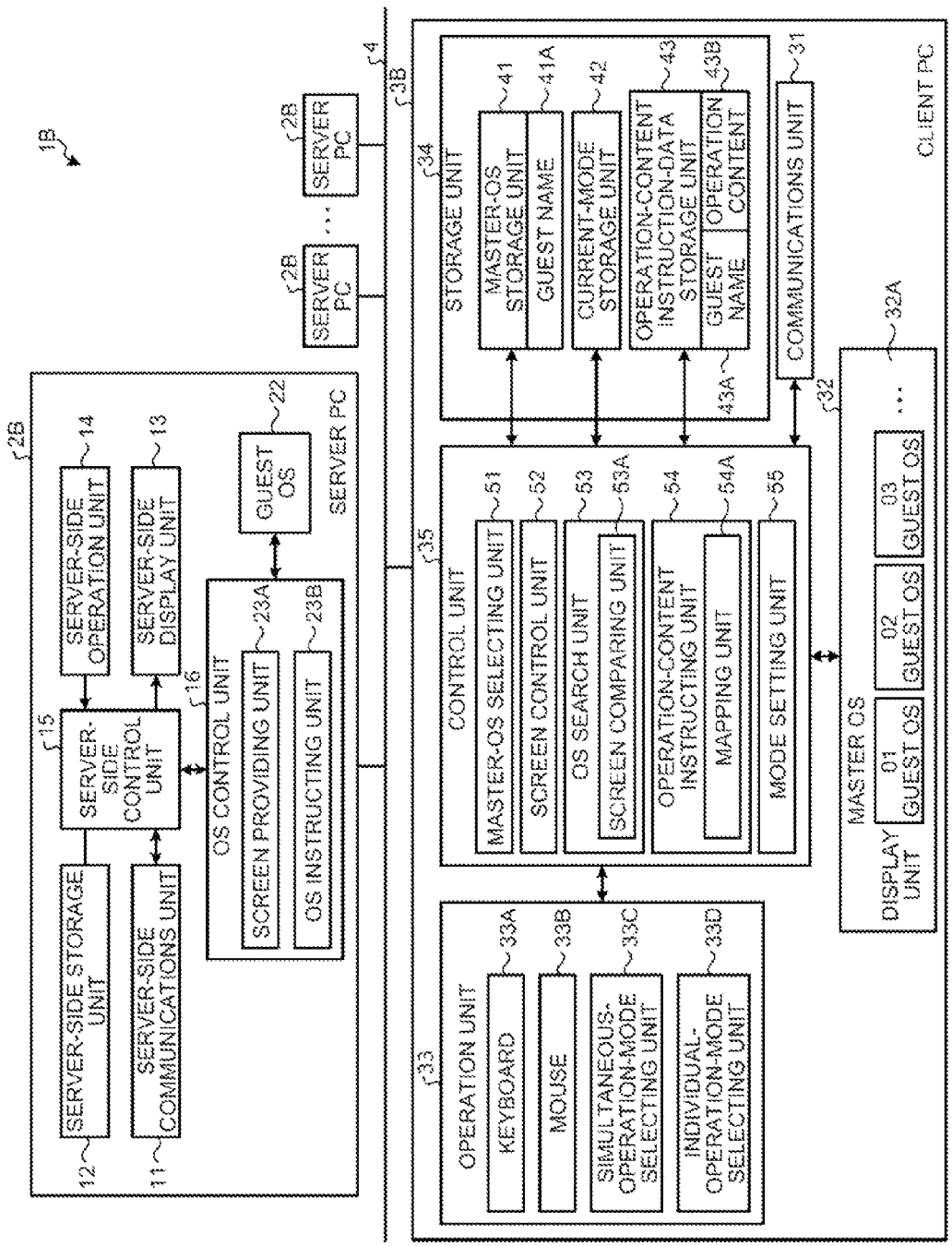

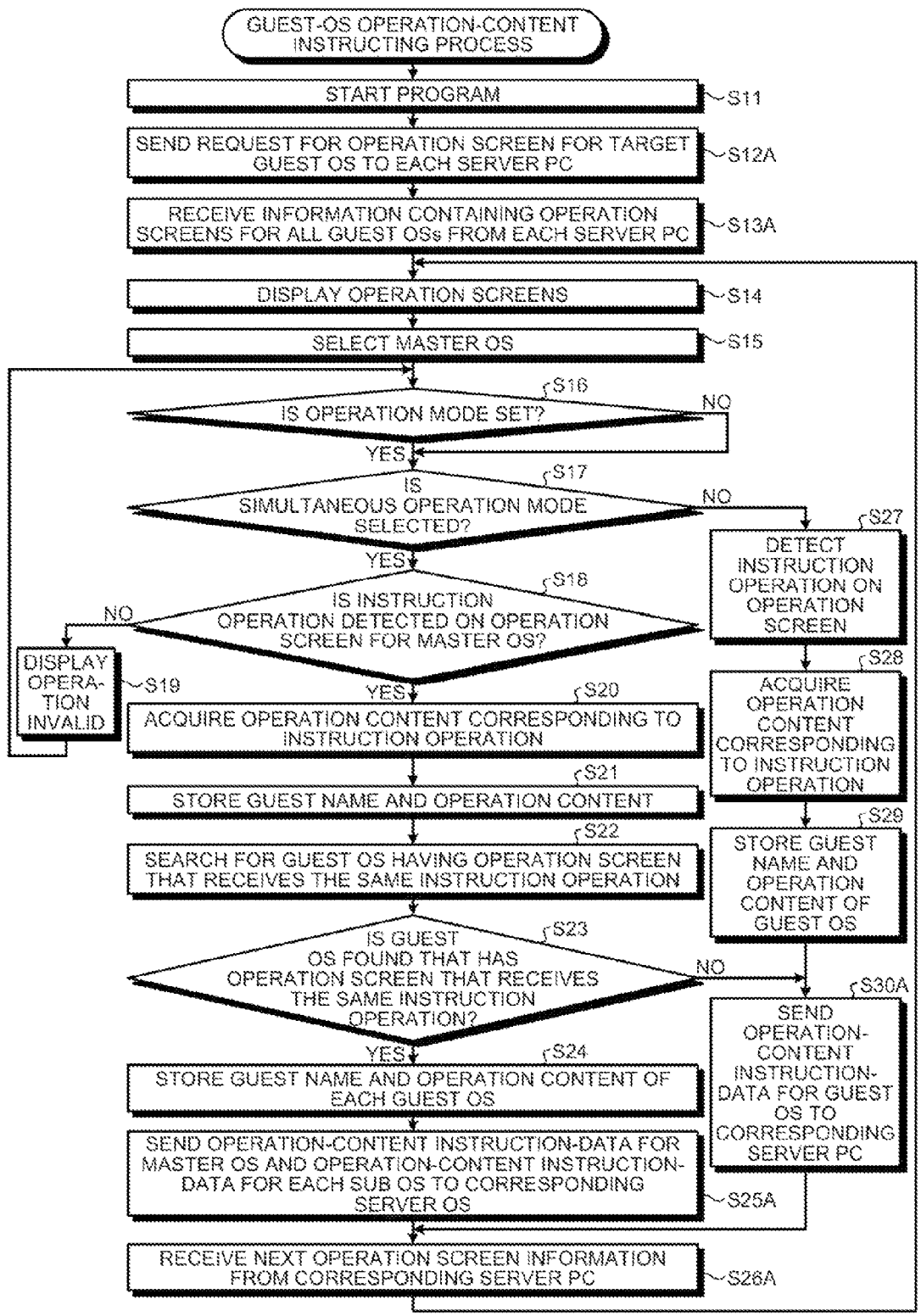

DISPLAY TERMINAL, DISPLAYING METHOD, AND RECORDING MEDIUM

CROSS-REFERENCE TO RELATED APPLICATION

This application is based upon and claims the benefit of priority of the prior Japanese Patent Application No. 2010-004410, filed on Jan. 12, 2010, the entire contents of which are incorporated herein by reference.

FIELD

The embodiments discussed herein are directed to an information terminal and a software operation-content instructing method.

BACKGROUND

FIG. 13 is a schematic diagram that illustrates a conventional guest operating system (guest OS) installation process in a real-machine environment. A plurality of personal computers (PCs) 200 is present in the real-machine environment. During the process for installing a guest OS onto the PCs 200, although the operation content for each PC is almost the same except for the IP address and the computer name to be input, the operator needs to visit each PC 200. The operator visits each PC 200 and executes almost the same operation content repeatedly when installing the guest OS on each PC 200.

FIG. 14 is a schematic diagram that illustrates a conventional guest OS installation process in a virtual-machine environment. A common server PC 300 in the conventional virtual-machine environment includes a plurality of guest OSs 301, a host OS 302, and a virtual machine monitor 303, all of which the common server PC 300 manages. The host OS 302 controls the guest OSs 301. The virtual machine monitor 303 monitors the virtual machines of the guest OSs 301, the host OS 302, and similar.

During the process for installing the guest OSs 301 on the common server PC 300, an operator needs to make almost the same instruction operation repeatedly in order to install the guest OSs 301 on the common server PC 300. Moreover, in the virtual-machine environment, the number of guest OSs to be installed on the common server PC 300 is likely to increase, which increases the operating load on the operator.

A solution that copes with the above problem is known in which an image file with the guest OS installed is created as a template and copies of the image file are created instead of the above installation process.

According to the above conventional technologies, copies of the image file are created instead of the above installation process. However, the guest OS maintenance needs not only the installation process but also other various processes; therefore, the simple installation process is not enough to reduce the operating load on the operator. The guest OS maintenance includes, for example, OS installation processing, application installation processing, OS and application batch processing, OS backup processing, batch execution, and routine-job start.

During the guest OS maintenance, the operator needs to log-in the console of each guest OS and then make almost the same instruction operation for each guest OS. Therefore, the operating load on the operator is still large.

Patent document 1: Japanese Laid-open Patent Publication No. 05-197575
Patent document 2: Japanese Laid-open Patent Publication No. 06-242913
Patent document 3: Japanese Laid-open Patent Publication No. 2000-75904

SUMMARY

According to an aspect of an embodiment of the invention, an information terminal includes a master selecting unit that selects master software from pieces of software that perform a computing process; a screen control unit that displays an operation screen for the master software that is selected by the master selecting unit on a screen; a software search unit that searches, when an instruction operation is detected on the operation screen for the master software, for any piece of software that displays an operation screen that receives the same instruction operation that the operation screen for the master software receives; and an operation-content instructing unit that instructs the master software and each piece software that is found by the software search unit about operation content corresponding to the instruction operation that has been detected on the operation screen for the master software.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a schematic diagram of an example of a screen of a client PC according to the second embodiment;

FIG. 4 is a flowchart of a guest-OS operation-content instructing process performed by the units included in the client PC according to the second embodiment;

FIG. 5 is a schematic diagram that illustrates, by reference to the operation screen for the master OS and the operation screen for the sub OS, a screen search process during the simultaneous operation mode;

FIG. 6 is a schematic diagram that illustrates operation content of the master OS and operation content of the sub OS, each corresponding to an instruction operation that is made for backup execution;

FIG. 7 is a block diagram of the configuration of a virtual machine system according to a third embodiment;

FIG. 8 is a flowchart of a client-PC authentication process performed by the units included in the host OS according to the third embodiment;

FIGS. 9A and 9B depict a flowchart of a guest-OS operation-content instructing process performed by the units included in the client PC according to the third embodiment;

FIG. 10 is a block diagram of the configuration of a computer system according to a fourth embodiment;

FIG. 11 is a flowchart of a guest-OS operation-content instructing process performed by the units included in the client PC according to the fourth embodiment;

DESCRIPTION OF EMBODIMENTS

Preferred embodiments of the present invention will be explained with reference to accompanying drawings. The present invention is not limited to the following embodiments.

[a] First Embodiment

Figure 1:
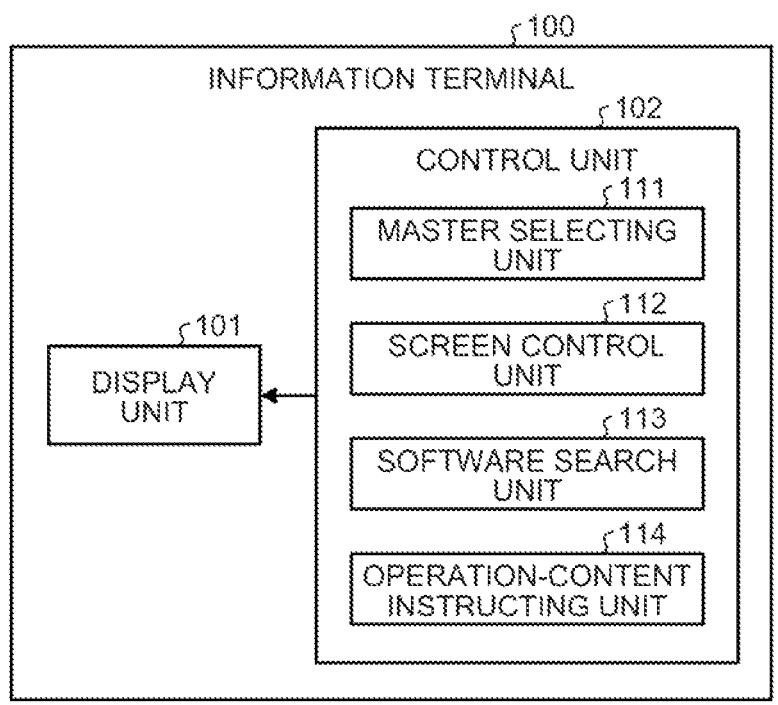
FIG. 1 is a block diagram of the configuration of an information terminal according to a first embodiment.

FIG. 1 is a block diagram of the configuration of an information terminal according to a first embodiment. An information terminal 100 illustrated in FIG. 1 includes a display unit 101 and a control unit 102. The display unit 101 displays various pieces of information on screens. The control unit 102 includes a master selecting unit 111, a screen control unit 112, a software search unit 113, and an operation-content instructing unit 114. The master selecting unit 111 selects master software from a plurality of pieces of software that performs computing processes. The screen control unit 112 displays an operation screen for the master software that is selected by the master selecting unit 111 on the display unit 101.

When an instruction operation is detected on the operation screen for the master software, the software search unit 113 searches for any piece of software that displays an operation screen that receives the same instruction operation that the operation screen for the master software receives. The operation-content instructing unit instructs the master software and each piece of software that is found by the software search unit 113 about operation content corresponding to the instruction operation that has been detected on the operation screen for the master software.

When an instruction operation is detected on the operation screen for the master software currently being appearing, the information terminal 100 searches for any piece of software that displays an operation screen that receives the same instruction operation that the operation screen for the master software receives. The information terminal 100 instructs the master software and each piece of software that is found by the search about operation content corresponding to the instruction operation that has been detected on the operation screen for the master software. After that, each of the master software and the software performs a process in accordance with the operation content corresponding to the instruction operation.

Therefore, when the same instruction operation is made for two or more pieces of software, with only one instruction operation that is made using the operation screen for the master software, the operator of the information terminal 100 can instruct each piece of software about the same operation content corresponding to the instruction operation.

Therefore, in the first embodiment, because the instruction operation for instructing two or more pieces of software about the same operation content is simplified, the operating load on the operator is reduced.

[b] Second Embodiment

Figure 2:
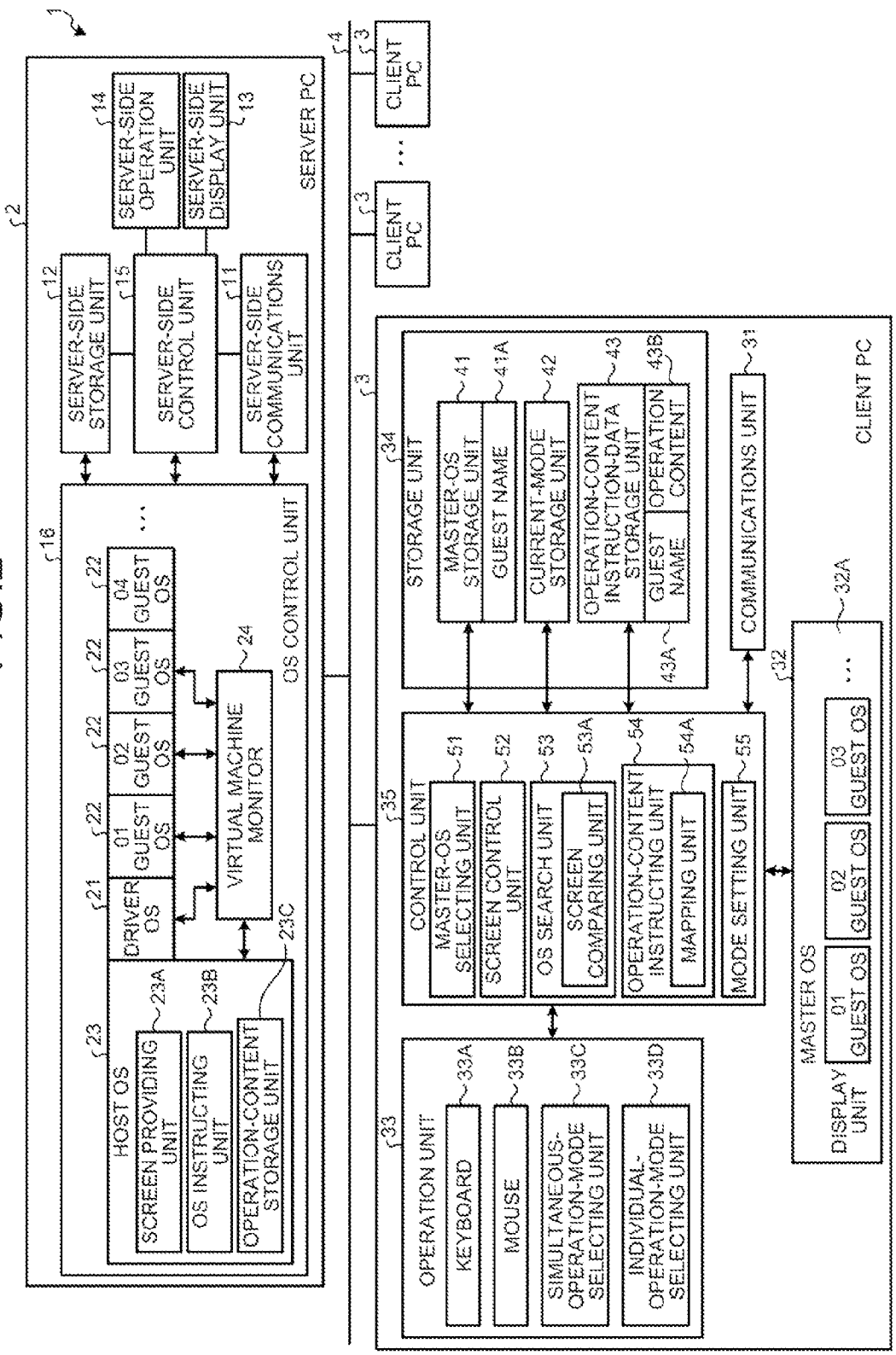
FIG. 2 is a block diagram of the configuration of a virtual machine system according to a second embodiment.

A virtual machine system according to a second embodiment is described in details below. FIG. 2 is a block diagram of the configuration of the virtual machine system. For the sake of simple explanation, the software is used for, for example, an operating system (OS). A virtual machine system 1 illustrated in FIG. 2 includes a server PC 2 and a plurality of client PCs 3. The server PC 2 and the client PCs 3 are connected to each other via, for example, a local area network (LAN) 4. The server PC 2 includes a server-side communications unit 11, a server-side storage unit 12, a server-side display unit 13, a server-side operation unit 14, a server-side control unit 15, and an OS control unit 16. The server-side communications unit 11 makes communications via the LAN 4. The server-side storage unit 12 stores therein various pieces of information. The server-side display unit 13 displays various pieces of information on screens. The server-side control unit 15 controls the server PC 2.

The OS control unit 16 includes a driver OS 21, guest OSs 22, a host OS 23, and a virtual machine monitor 24. The driver OS 21 controls an input/output interface for hardware, such as the server-side communications unit 11, the server-side storage unit 12, the server-side display unit 13, and the server-side operation unit 14. The guest OSs 22 perform various computing processes. The host OS 23 controls both the driver OS 21 and the guest OSs 22 and manages operation of the guest OSs 22. The host OS 23 is automatically started when the virtual machine system 1 is boot up. The virtual machine monitor 24 monitors virtual machines, such as the driver OS 21, the guest OSs 22, and the host OS 23.

The host OS 23 includes a screen providing unit 23A, an OS instructing unit 23B, and an operation-content storage unit 23C. The screen providing unit 23A provides the client PCs 3 with the operation screens for the respective guest OSs 22. The OS instructing unit 23B sends operation content corresponding to an instruction operation received from the client PC 3 to the corresponding guest OS 22. The operation-content storage unit 23C stores therein operation content data corresponding to an instruction operation received from the client PC as temporal data.

The client PC 3 includes a communications unit 31, a display unit 32, an operation unit 33, a storage unit 34, and a control unit 35. The communications unit 31 makes communications via the LAN 4. The display unit 32 displays various pieces of information on screens. The display unit 32 displays thereon the operation screens for the guest OSs 22 that are under the management of the server PC 2 using a virtual network computing (VNC).

The operation unit 33 is used to input various instructions. The operation unit 33 includes a keyboard 33A, a mouse 33B, a simultaneous-operation-mode selecting unit 33C, and an individual-operation-mode selecting unit 33D. The individual-operation-mode selecting unit 33D is set a first operation mode to be selected to receive individually an instruction operation via the operation screen for the guest OS 22 that is currently appearing on the display unit 32 by using the VNC. The simultaneous-operation-mode selecting unit 33C is set a second operation mode to be selected to receive simultaneously an instruction operation for two or more guest OSs 22 via the guest OS 22 that are currently appearing on the display unit 32 by using the VNC. The simultaneous-operation-mode selecting unit 33C and the individual-operation-mode selecting unit 33D can be designed to appear on the display unit 32 within an operation-mode selection window 32B that is separated from an operation screen window 32A (see FIG. 3).

The storage unit 34 stores therein various pieces of information. The storage unit 34 includes a master-OS storage unit 41, a current-mode storage unit 42, and an operation-content instruction-data storage unit 43. The master-OS storage unit 41 stores therein a later-described guest name 41A for identifying the currently selected master OS. The current-mode storage unit 42 stores therein the currently selected mode that is either the individual operation mode or the simultaneous operation mode. The operation-content instruction-data storage unit 43 stores therein a guest name 43A for identifying a target guest OS 22 corresponding to an instruction operation and operation content 43B corresponding to the instruction operation. The operation content includes, for example, the mouse position and values input via the keyboard.

The control unit 35 controls the client PC 3. The control unit 35 includes a master-OS selecting unit 51, a screen control unit 52, an OS search unit 53, an operation-content instructing unit 54, and a mode setting unit 55. The master-OS selecting unit 51 selects, from the operation screens for the guest OSs 22 that are currently appearing on the display unit 32, the operation screen for an arbitrary guest OS 22 as the operation screen for the master OS. The screen control unit 52 controls screens appearing on the display unit 32 and displays the operation screen for each guest OS 22 on the screen by using the VNC. When an instruction operation is detected on the operation screen for the master OS, the OS search unit 53 searches for any guest OS 22 that displays an operation screen that receives the same instruction operation that the operation screen for the master OS receives amongst the operation screens that are currently appearing on the display unit 32.

The operation-content instructing unit 54 send operation content corresponding to the instruction operation that has been detected on the operation screen via the LAN 4 to the host OS 23 of the server PC 2 that manages the guest OS 22. If the individual operation mode is selected, the operation-content instructing unit 54 sends the operation content corresponding to the instruction operation that has been detected on the operation screen for the guest OS 22 to the host OS 23 of the server PC 2 that manages the guest OS 22. If the simultaneous operation mode is selected, the operation-content instructing unit 54 sends the operation content corresponding to the instruction operation that has been detected on the operation screen for the master OS to the host OS 23 of the server PC 2 that manages the two or more guest OSs 22. The operation content includes, for example, a relative position of the operation on the operation screen, such as the mouse position, and values input via the keyboard. The mode setting unit 55 sets the operation mode that is selected by either the simultaneous-operation-mode selecting unit 33C or the individual-operation-mode selecting unit 33D to the current mode and stores the current mode in the current-mode storage unit 42.

The client PCs 3 are connected to the server PC 2 via the LAN 4. When a certain guest OS 22 is selected to be the target guest OS 22 by operation of the mouse or the similar, the client PC 3 sends a request for the operation screen for the selected guest OS 22 to the host OS 23 of the server PC 2. Upon receiving the operation-screen acquisition request, the screen providing unit 23A of the host OS 23 collects the operation screen for every guest OS 22 that is under the management of the host OS 23 from each guest OS 22 and sends these operation screens for the guest OSs 22 to the client PC 3 as operation screen information. FIG. 3 is a schematic diagram of an example of a screen of the client PC 3 according to the second embodiment. For the sake of simple explanation, the target guest OS 22 is represented as "guest OS 01", and the guest OSs 22 that displays the operation screen that receives the same instruction operation that the operation screen for the guest OS 01 receives are represented as "guest OS 02" and "guest OS 03".

In the example illustrated in FIG. 3, upon receiving the operation screen information from the screen providing unit 23A of the host OS 23, the screen control unit 52 displays the operation screens for the guest OSs 01, 02, and 03 on the operation screen window 32A of the display unit 32. The screen control unit 52 also displays the simultaneous-operation-mode selecting unit 33C and the individual-operation-mode selecting unit 33D each functioning as the operation unit 33 on the separated window or the operation-mode selection window 32B of the display unit 32.

The operator of the client PC 3 selects, for example, the guest OS 01 to be the master OS by using the mouse 33B or similar; thus the unselected guests OS 02 and 03 is displayed on the operation screen window 32A of the display unit 32 as sub-OSs. When the client PC 3 detects an instruction operation that indicates "Next" on the operation screen for the master OS during the simultaneous operation mode, the client PC 3 instructs the guest OSs 02 and 03 about operation content corresponding to "Next" without instruction operations that are made using the operation screens for the guest OSs 02 and 03. Therefore, the operator can give instructions for the three guest OSs 22 with one operation. This decreases the operating load on the operator to ⅓ of the conventional operating load.

The operation of the virtual machine system 1 is described below according to the second embodiment. FIG. 4 is a flowchart of a guest-OS operation-content instructing process performed by the units included in the client PC 3 according to the second embodiment. During the guest-OS operation-content instructing process illustrated in FIG. 4, when an instruction operation is detected on the operation screen for the master OS, which is one of the operation screens appearing on the operation screen window 32A, operation content corresponding to the instruction operation that has been detected on the operation screen for the master OS is sent to each of the master OS and the sub OS.

In the flowchart of FIG. 4, when the control unit 35 included in the client PC 3 detects that the programs are started (Step S11) and detects an instruction operation for the target guest OS 22, the control unit 35 sends a request for the operation screen for the target guest OS 22 to the host OS 23 of the server PC 2 (Step S12). Upon receiving the operation-screen acquisition request, the screen providing unit 23A included in the host OS 23 collects the operation screen for every guest OS 22 that is under the management of the host OS 23 from each guest OS 22. The screen providing unit 23A sends the operation screens for the guest OSs 22 to the client PC 3 as operation screen information.

When the screen control unit 52 included in the control unit 35 receives the operation screen information from the host OS 23 (Step S13), the screen control unit 52 displays, in accordance with the operation screen information, the operation screen of each guest OS 22 on the screen of the display unit 32 (Step S14). In the example illustrated in FIG. 3, the operation screens for the guest OSs 01, 02, and 03 are displayed on the screen of the display unit 32.

The master-OS selecting unit 51 included in the control unit 35 selects, from the operation screens for the guest OSs 22 that are appearing on the screen in accordance with an instruction operation by operation of the mouse 33B or the similar, an arbitrary guest OS 22 to be the master OS (Step S15). The control unit 35 stores the guest name 42A for identifying the master OS that is selected by the master-OS selecting unit 51 in the master-OS storage unit 41. In the example illustrated in FIG. 3, the guest OS 01 is selected to be the master OS and the operation screens for the unselected guest OSs 02 and 03 are displayed as the operation screens for the sub OSs.

After that, the mode setting unit 55 included in the control unit 35 determines whether the operation mode is set in accordance with the setting selection made by the simultaneous-operation-mode selecting unit 33C or the individual-operation-mode selecting unit 33D (Step S16). If the operation mode is set (Yes at Step S16), the mode setting unit 55 stores the operation mode in the current-mode storage unit 42 as the current mode. If the operation mode is not set (No at Step S16), the mode setting unit 55 stores the previous operation mode that has already been stored in the current-mode storage unit 42 as the current mode. The control unit 35 further determines, in accordance with information stored in the current-mode storage unit 42, the current mode is the simultaneous operation mode (Step S17). If the current mode is the simultaneous operation mode (Yes at Step S17), the control unit 35 determines whether an instruction operation has been detected on the operation screen for the master OS (Step S18).

If an instruction operation has not been detected on the operation screen for the master OS (No at Step S18), the control unit 35 determines that the instruction operation has been detected on the operation screen for a sub OS and displays a message "operation invalid" on the display unit 32 (Step S19), and the process control goes to Step S16. When checking the message "operation invalid" displayed, the operator will recognize that the instruction operation that is made using the operation screen for the sub OS is invalid.

If the instruction operation has been detected on the operation screen for the master OS (Yes at Step S18), the control unit 35 acquires operation content corresponding to the instruction operation (Step S20). When the operation content is acquired, the control unit 35 stores the guest name 43A for identifying the master OS and the operation content 43B in the operation-content instruction-data storage unit 43 (Step S21). The OS search unit 53 included in the control unit 35 searches for any sub OS having the same operation screen as the operation screen for the master OS amongst two or more sub OSs (Step S22). The control unit 35 determines whether any sub OS has the same operation screen as the operation screen for the master OS (Step S23).

If any sub OS has the same operation screen as the operation screen for the master OS (Yes at Step S23), the control unit 35 stores the guest name 43A for identifying each sub OS and the operation content 43B that has been acquired at Step S20 in the operation-content instruction-data storage unit 43 (Step S24). The operation content corresponding to the instruction operation that has been detected on the operation screen for the master OS is used as the operation content for the sub OS. The control unit 35 sends the operation-content instruction-data assigned to the master OS and the sub OS to the host OS 23 (Step S25). More particularly, the control unit 35 sends, to the host OS 23, the guest name 43A and the operation content 43B assigned to the master OS and the guest name 43A and the operation content 43B assigned to each sub OS. The guest name 43A and the operation content 43B are stored in the operation-content instruction-data storage unit 43. Upon receiving the operation-content instruction-data, the OS instructing unit 23B included in the host OS 23 stores the operation-content instruction-data in the operation-content storage unit 23C. The OS instructing unit 23B then sends an operation instruction corresponding to the operation content to the corresponding guest OS 22 in accordance with the operation-content instruction-data that is stored in the operation-content storage unit 23C. Upon receiving the operation instruction, the guest OS 22 performs a process in accordance with the received operation instruction and then sends a next operation screen to the host OS 23. The screen providing unit 23A of the host OS 23 then sends operation screen information to the client PC 3 that contains the next operation screen for the master OS and the next operation screens for the guest OSs 22.

When the screen control unit 52 included in the control unit 35 receives the operation screen information about the master OS and the guest OSs 22 from the host OS 23 (Step S26), the control process goes to Step S14 and the operation screens for the master OS and the guests OS 22 are displayed on the screen of the display unit 32 in accordance with the operation screen information.

If the current mode is not the simultaneous operation mode (No at Step S17), the control unit 35 determines that the current mode is the individual operation mode and detects an instruction operation on the operation screen for the guest OS 22 (Step S27). If an instruction operation is detected on the operation screen, the control unit 35 acquires operation content corresponding to the instruction operation (Step S28). When the operation content is acquired, the control unit 35 stores the guest name 43A for identifying the guest OS and the operation content 43B in the operation-content instruction-data storage unit 43 (Step S29). The control unit 35 sends the operation-content instruction-data assigned to the guest OS 22 to the host OS 23 (Step S30), and the process control goes to Step S26 and operation screen information that contains the next operation screen is received from the host OS 23. If no sub OS has the same operation screen as the operation screen for the master OS (No at Step S23), the control unit 35 shifts to the individual operation mode. The process control goes to Step S30 and operation-content instruction-data corresponding to the instruction operation made using the operation screen is sent to the host OS 23.

During the guest-OS operation-content instructing process illustrated in FIG. 4, if an instruction operation is detected on the operation screen for the master OS when the simultaneous operation mode is selected, the sub OS that displays the operation screen that receives the same instruction operation that the operation screen for the master OS receives is instructed about operation content corresponding to the instruction operation for the master OS. Therefore, with only one instruction operation that is made using the operation screen for the master OS, the operator can give instructions for two or more sub OSs about the operation content corresponding to the instruction operation. This decreases, if the number of the master OS and the sub OSs is N, the operating load on the operator to 1/N of the conventional operating load.

During the guest-OS operation-content instructing process, if an instruction operation is detected on the operation screen for a sub OS when the simultaneous operation mode is selected, a message "the instruction operation is invalid" is displayed on the screen. When checking the message "operation invalid", the operator will recognize that the operation made using the operation screen for the sub OS is invalid.

During the guest-OS operation-content instructing process, if an instruction operation is detected on the operation screen for the selected guest OS when the individual operation mode is selected, the guest OS is instructed about operation content corresponding to the instruction operation. Therefore, the operator can input individual operation content to the corresponding guest OS.

FIG. 5 is a schematic diagram that illustrates, by reference to the operation screen for the master OS and the operation screen for the sub OS, a screen search process during the simultaneous operation mode. The OS search unit 53 of the control unit 35 includes a screen comparing unit 53A. The screen comparing unit 53A acquires image data assigned to areas near the mouse pointer position X and the cursor position Y on the operation screen for the master OS that is currently appearing on the display unit 32 (Step S101). When the screen comparing unit 53A acquires image data assigned to the areas near the mouse pointer position X and the cursor position Y on the operation screen for the master OS, the screen comparing unit 53A compares the acquired image data with the operation screen for each sub OS. The OS search unit 53 searches, in accordance with the comparison result obtained by the screen comparing unit 53A, for any sub OS having the same operation screen as the operation screen for the master OS amongst two or more sub OSs (Step S102).

The operation-content instructing unit 54 of the control unit 35 further includes a mapping unit 54A. The mapping unit 54A compares the operation screen for the master OS with the operation screen for each sub OS and converts input data corresponding to the instruction operation that is made using the operation screen for the master OS into the relative position on the operation screen for the sub OS (Step S103). The mapping unit 54A inputs the input data corresponding to the instruction operation that is made using the operation screen for the master OS to the relative position on the operation screen for the sub OS (Step S103). After that, the operation-content instructing unit 54 sends, to the host OS 23, operation-content instruction-data that contains the guest name 43A and the operation content 43B of the master OS and the guest name 43A and the operation content 43B of each sub OS (Step S104). Upon receiving the operation-content instruction-data, the host OS 23 sends the operation content to the master OS in accordance with the guest name 43A and the operation content 43B of the master OS that are extracted from the operation-content instruction-data (Step S104A). Moreover, the host OS 23 sends the operation content to the sub OS in accordance with the guest name 43A and the operation content 43B of the sub OS that are extracted from the operation-content instruction-data (Step S104B).

FIG. 6 is a schematic diagram that illustrates operation content of the master OS and operation content of the sub OS, each corresponding to an instruction operations that is made for backup execution. Suppose, for the sake of simple explanation, a case that the operation screen for the guest OS 01 is the same as the operation screen for the guest OS 02, the guest OS 01 is the master OS, and the guest OS 02 is the sub OS.

When the same operation content, such as activation of backup program, is to input via two or more operation screens for the guest OSs 22, the operator selects the simultaneous-operation-mode selecting unit 33C and sets the client PC 3 to the simultaneous operation mode. The client PC 3 detects, during the simultaneous operation mode, an instruction operation on the operation screen for the master OS (the guest OS 01) that indicates activation of backup program "backup.exe" as operation content. When the client PC 3 detects activation of backup program "backup.exe", the client PC 3 automatically inputs "backup.exe" with the operation screen for the sub OS (the guest OS 02) as operation content. As a result, the client PC 3 sends, to the host OS 23, operation-content instruction-data that contains the guest name (the guest OS 01) and the operation content ("backup.exe") and the guest name (the guest OS 02) and the operation content ("backup.exe").

The client PC 3 further detects, during the simultaneous operation mode, an instruction operation on the operation screen for the master OS that indicates selection of backup data "d\etc\backup\*.*" as operation content. When the client PC 3 detects selection of backup data "d\etc\backup\*.*", the client PC 3 automatically inputs "d\etc\backup\*.*" with the operation screen for the sub OS as operation content. As a result, the client PC 3 sends, to the host OS 23, operation-content instruction-data that contains the guest name (the guest OS 01) and the operation content ("d\etc\backup\*.*") and the guest name (the guest OS 02) and the operation content ("d\etc\backup\*.*").

When the individual operation content, such as destination of backup data, is to input to each guest OS 22, the operator selects the individual-operation-mode selecting unit 33D and sets the client PC 3 to the individual operation mode. When the client PC 3 detects, during the individual operation mode, a mouse instruction operation for selecting the operation screen for the master OS (the guest OS 01), the client PC 3 inputs a destination of backup data "\\10.1.1.1\OS1" with the operation screen as operation content. As a result, the client PC 3 sends, to the host OS 23, operation-content instruction-data that contains the guest name (the guest OS 01) and the operation content ("\\10.1.1.1\OS1"). When the client PC 3 detects, during the individual operation mode, a mouse instruction operation for selecting the guest OS 02, the client PC 3 inputs a destination of backup data "\\10.1.1.1\OS2" with the operation screen as operation content. As a result, the client PC 3 sends, to the host OS 23, operation-content instruction-data that contains the guest name (the guest OS 02) and the operation content ("\\10.1.1.1\OS2").

When the same operation content, such as response to a confirmation message, is to input via two or more operation screens for the guest OSs 22, the operator selects the simultaneous-operation-mode selecting unit 33C and sets the client PC 3 to the simultaneous operation mode. The client PC 3 detects, during the simultaneous operation mode, a click operation on the operation screen for the master OS (the guest OS 01) that indicates [Yes] as a response to the confirmation message "OK? [Yes] or [No]" as operation content. When the client PC 3 detects a click operation indicative of [Yes] as a response to the confirmation message, the client PC automatically inputs [Yes] as a response to the confirmation message as operation content for the sub OS (the guest OS 02). As a result, the client PC 3 sends, to the host OS 23, operation-content instruction-data that contains the guest OS 01 and [Yes] as a response to the confirmation message and the guest OS 02 and [Yes] as a response to the confirmation message.

After that, the host OS 23 causes the guest OS 01 and the guest OS 02 to perform the backup process. As described above, the operator of the client PC 3 can cause the guest OS 01 and the guest OS 02 to perform the backup process.

When the client PC 3 detects an instruction operation on the operation screen for the master OS in the second embodiment, a search is made amongst two or more sub OSs for any sub OS that displays the operation screen that receives the same instruction operation that the operation screen for the master OS receives. Moreover, in the second embodiment, the master OS and each sub OS are instructed about operation content corresponding to the instruction operation that has been detected on the operation screen for the master OS. Most routine jobs involve causing all the guest OSs 22 to perform the same process at the same time. The operating load on the operator is reduced remarkably by decreasing the number of instruction operations for causing two or more guest OSs 22 to perform the same operation content to one. Moreover, in the second embodiment, because such control is achieved by operation of the client PC 3 by using the VNC, it is unnecessary to modify the guests OS 22 and the virtual machine monitor 24 and, moreover, any type of the guest OS 22 can achieve such control.

In the second embodiment, the operation screen for the master OS is compared with the operation screen for each guest OS. In accordance with the comparison result, the relative position on the operation screen for each guest OS 22 is determined using the position of the instruction operation has been detected on the operation screen for the master OS. Moreover, in the second embodiment, during the mapping process, operation content corresponding to the instruction operation that has been detected on the operation screen for the master OS is assigned to the determined relative position of each guest OS 22. Moreover, in the second embodiment, each sub guest OS 22 is instructed about the operation content corresponding to the instruction operation that has been detected on the operation screen for the master OS. Therefore, the operating load on the operator is reduced by decreasing the number of instruction operations for causing two or more guest OSs 22 to perform the same operation content to one.

In the second embodiment, several operation screens are displayed that includes not only the operation screen for the master OS but also the operation screen for the sub OS that receives the same instruction operation that the operation screen for the master OS receives. When checking the screen, the operator will recognize the master OS and the sub OS.

In the second embodiment, if the simultaneous operation mode is selected, an instruction operation that is made using the operation screen for the master OS is accepted. Moreover, in the second embodiment, in response to the instruction operation that is made using the operation screen for the master OS, the master OS and the sub OS that displays the operation screen that receives the same instruction operation that the operation screen for the master OS receives are instructed about operation content corresponding to the instruction operation that has been detected on the operation screen for the master OS. Therefore, the operating load on the operator is reduced remarkably by decreasing the number of instruction operations for causing two or more guest OSs 22 to perform the same operation content to one.

In the second embodiment, if the simultaneous operation mode is selected, an instruction operation that is made using the operation screen for any guest OS 22 other than the master OS is invalid. A message "operation invalid" is then displayed on the screen. Therefore, the operator will recognize the operation invalid because it is made using the operation screen for the guest OS that is not the master OS during the simultaneous operation mode.

In the second embodiment, if the individual operation mode is selected, in response to an instruction operation that has been detected on the operation screen for the guest OS 22, the corresponding guest OS 22 is instructed about operation content corresponding to the instruction operation. Therefore, the operator can send individual operation content depending on the guest OS 22.

In the above-described second embodiment, the client PC 3 is connected to the server PC 2 and every client PC 3 can instruct the guest OSs 22 included in the server PC 2 about operation content as appropriately. This may lead a situation where the system cannot prevent an illegal access from an illegal third-party client PC 3 to the guest OS 22.

[c] Third Embodiment

A virtual machine system is described below according to a third embodiment that prevents such an illegal access from the client PC 3 to the guest OS 22. FIG. 7 is a block diagram of the configuration of the virtual machine system according to the third embodiment. The same components as those included in the virtual machine system 1 according to the second embodiment are denoted with the same reference numerals and the same description about the components and the processes are not repeated.

A virtual machine system 1A is different from the virtual machine system 1 according to the second embodiment in that the host OS 23 of the OS control unit 16 included in a server PC 2A includes an authentication unit 61 and an authentication table 62. The authentication table 62 is used to manage an IP/MAC address 62B and an accessible guest OS name 62C on the basis of each client PC name 62A. The client PC name 62A corresponds to the name for identifying the client PC 3. The IP/MAC address 62B corresponds to communication address information about a client PC 3A. The accessible guest OS name 62C corresponds to the guest OS name of the guest OS to which the client PC 3A is permitted to send an instruction.

The authentication unit 61 detects a request for the operation screen for the target guest OS 22 coming from the client PC 3A. The operation-screen acquisition request contains the target guest OS name and the IP/MAC address of the sender client PC 3A. When an operation-screen acquisition request is detected, the authentication unit 61 determines whether the sender client PC 3A is authentic to instruct the target guest OS 22 about operation content. If the sender client PC 3A is authentic to instruct the target guest OS 22 about operation content, the authentication unit 61 determines that the client PC 3A is authentic and permits access from the sender client PC 3A to the guest OS 22. If the sender client PC 3A is not authentic to instruct the target guest OS 22 about operation content, the authentication unit 61 determines that the client PC 3A is unauthentic and denies access from the sender client PC 3A to the guest OS 22.

The operation of the virtual machine system 1 is described below according to the third embodiment. FIG. 8 is a flowchart of a client-PC authentication process performed by the units included in the host OS 23 according to the third embodiment. The client-PC authentication process illustrated in FIG. 8 is performed to manage the accessible guest OS 22 of each client PC 3A and prevent an illegal access from an illegal third-party client PC 3A to the guest OS 22.

In the flowchart of FIG. 8, the authentication unit 61 of the host OS 23 determines whether an operation-screen acquisition request has been received from the client PC 3A (Step S41). The operation-screen acquisition request includes the target gust OS name of the guest OS selected by the sender client PC 3A and the IP/MAC address of the sender client PC 3A.

If an operation-screen acquisition request has been received from the client PC 3A (Yes at Step S41), the authentication unit 61 acquires the IP/MAC address of the sender client PC 3A and the guest name of the target guest OS 22 from the operation-screen acquisition request (Step S42).

The authentication unit 61 determines whether the IP/MAC address of the client PC 3A is included in the authentication table (Step S43). If the IP/MAC address of the client PC 3A is included in the authentication table (Yes at Step S43), the authentication unit 61 determines whether the guest name of the target guest OS 22 is accordant with the guest name of the accessible guest OS 22 (Step S44).

If the guest name of the target guest OS 22 is accordant with the guest name of the accessible guest OS 22 (Yes at Step S44), the authentication unit 61 determines that the client PC 3A is authentic to access the target guest OS 22 (Step S45).

If the client PC 3A is determined to be authentic, the screen providing unit 23A sends operation screen information containing the operation screen for the accessible guest OS 22 to the client PC 3A (Step S46) and the process illustrated in FIG. 8 is then completed. The screen providing unit 23A collects the operation screen from the accessible guest OS 22 and creates the operation screen information that contains the operation screen for the accessible guest OS 22. If the accessible guest OS 22 includes the guest OSs 01 and 02, the screen providing unit 23A collects the operation screens for the guest OSs 01 and 02.

If the IP/MAC address of the client PC 3A is not included in the authentication table (No at Step S43), the authentication unit 61 determines that the client PC 3A is unauthentic and denies access from the client PC 3A to the target guest OS 22 (Step S47). The authentication unit 61 then sends the authentication result indicative of unauthentication to the client PC 3A (Step S48), and the process illustrated in FIG. 8 is completed. If no operation-screen acquisition request has been received from the client PC 3A (No at Step S41), the authentication unit 61 completes the process illustrated in FIG. 8.

During the client-PC authentication process illustrated in FIG. 8, the accessible guest OS 22 is managed on the basis of the IP/MAC address of each client PC 3A and a request for the operation screen for the target guest OS 22 coming from the client PC 3A is detected. Moreover, during the client-PC authentication process, when an operation-screen acquisition request is detected, if the accessible guest OS corresponding to the IP/MAC address of the client PC 3A includes the target guest OS 22, the client PC 3A is determined to be authentic. As a result, if the client PC 3A is authentic, the server PC 2A permits access from the client PC 3A to the target guest OS 22 and provides the client PC 3A with the operation screen for the accessible guest OS 22 of the client PC 3A.

Moreover, during the client-PC authentication process, if the accessible guest OS does not include the target guest OS 22, the client PC 3A is determined to be unauthentic. As a result, because the client PC 3A is unauthentic, the server PC 2A denies access from the client PC 3A to the target guest OS 22, which prevents an illegal access from a third-party client PC 3A to the guest OS.

Figure 9A:
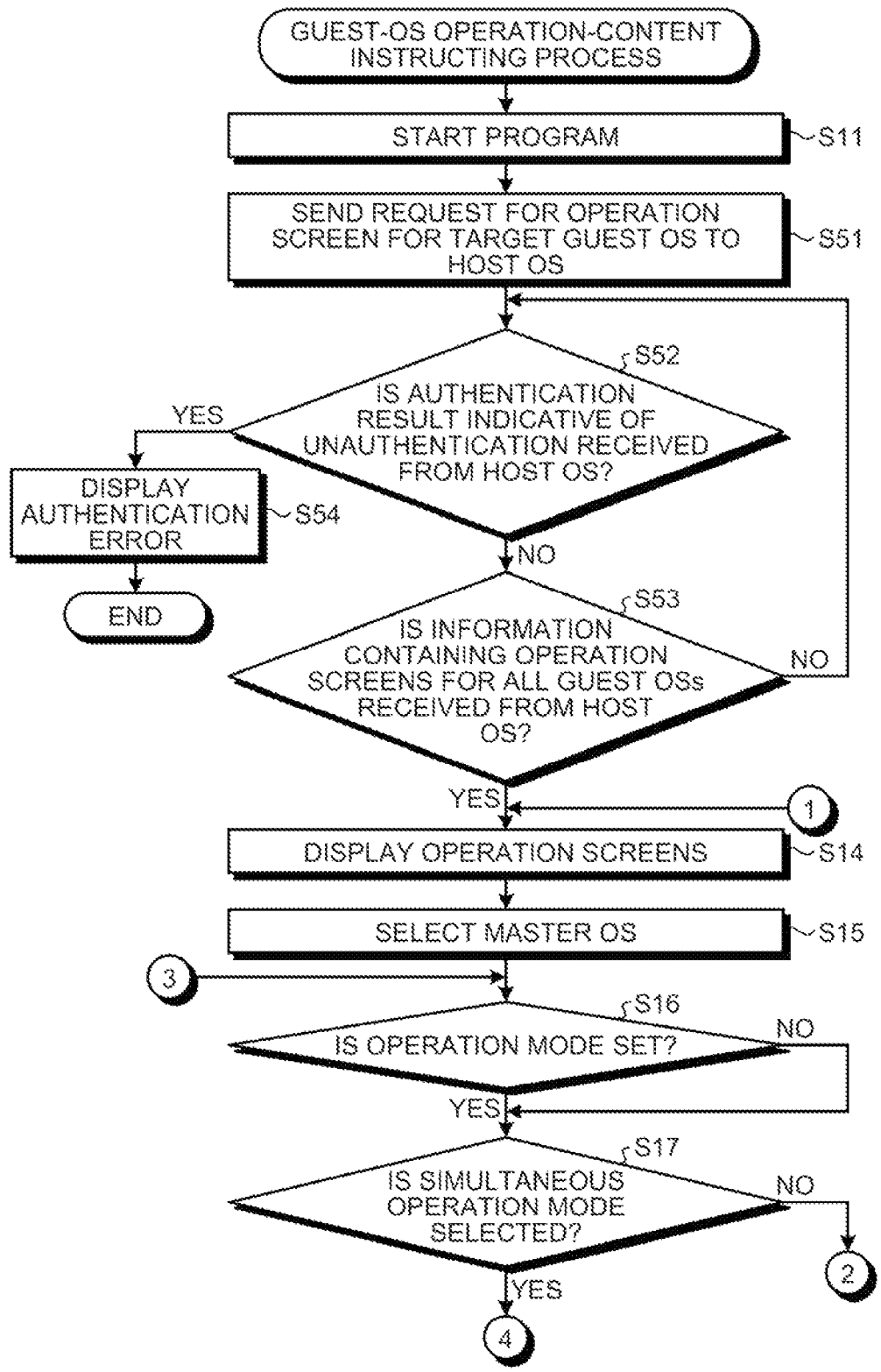

FIGS. 9A and 9B depict a flowchart of a guest-OS operation-content instructing process performed by the units included in the client PC 3A according to the third embodiment.

In the flowchart of FIG. 9A, when the program is started at Step S11, the control unit 35 included in the client PC 3A sends a request for the operation screen for the target guest OS 22 to the host OS 23 (Step S51). The operation-screen acquisition request includes not only the guest name of the target guest OS 22 but also the IP/MAC address of the sender client PC 3A. After the operation-screen acquisition request is sent to the host OS 23, the control unit 35 determines whether an authentication result indicative of unauthentication has been received from the host OS 23 (Step S52). If an authentication result indicative of unauthentication has not been received from the host OS 23 (No at Step S52), the control unit 35 assumes that the client PC 3A is authentic and determines whether the operation screen information that contains the operation screen for the accessible guest OS 22 has been received from the host OS 23 (Step S53).

If the operation screen information that contains the operation screen for the accessible guest OS 22 has been received from the host OS 23 (Yes at Step S53), the process control goes to Step S14 and the screen control unit 52 displays the operation screen for the accessible guest OS 22 on the display unit 32.

If no operation screen has been received from the host OS 23 (No at Step S53), the process control goes to Step S52 and the control unit 35 determines whether an authentication result indicative of unauthentication has been received from the host OS 23. If an authentication result indicative of unauthentication has been received (Yes at Step S52), the control unit 35 displays a message "authentication error" on the display unit 32 (Step S54) and then the process illustrated in FIG. 9A is completed. When checking the message "authentication error" displayed on the screen, the operator will recognize that the client PC 3A is unauthentic to access the target guest OS 22.

During the guest-OS operation-content instructing process illustrated in FIG. 9A, if, as a response to the request for the operation screen for the target guest OS 22, an authentication result indicative of unauthentication is received from the host OS 23, a message "authentication error" is displayed on the screen. When checking the message "authentication error", the operator will recognize that the client PC 3A is unauthentic to access the target guest OS 22.

During the guest-OS operation-content instructing process, in response to the request for the operation screen for the target guest OS 22, as an authentication result indicative of authentication, the operation screen information that contains the operation screen for the accessible guest OS 22 is received from the host OS 23. This enables the client PC 3A to display the operation screen for the accessible guest OS 22 on the screen.

In the third embodiment, in a virtual-machine environment with the two or more guest OSs 22 and the host OS 23, the host OS 23 manages the accessible guest OS 22 of the client PC 3A on the basis of the IP/MAC address of each client PC 3A. Moreover, in the third embodiment, when the host OS 23 detects a request for the operation screen for the target guest OS 22 coming from the client PC 3A, whether the target guest OS 22 is accordant with the accessible guest OS corresponding to the IP/MAC address of the client PC 3A is determined. Moreover, in the third embodiment, if the target guest OS 22 is accordant with the accessible guest OS 22, the operation screen for the accessible guest OS 22 is sent to the client PC 3A. This enables the client PC 3A to display the operation screen for the accessible guest OS 22 on the screen.

Moreover, in the third embodiment, if the target guest OS 22 is not accordant with the accessible guest OS 22, an authentication error is sent to the client PC 3A. When checking the authentication error, the operator will recognize that the client PC 3A is unauthentic to access the target guest OS 22.

Although, in the above-described third embodiment, the guest name of the accessible guest OS 22 is managed in a way each assigned to the IP/MAC address of the client PC 3A, some other identification information for identifying the client PC 3A can be used instead of the IP/MAC address.

In the second embodiment and the third embodiment, the client PC 3A is connected to the server PC 2A via the LAN and the client PC 3A instructs each guest OS 22 included in the server PC 2A in the virtual-machine environment about operation content. The client PC can also obtain the same effects when, for example, the virtual-machine environment is built in the storage unit 34 and the client PC instructs each guest OS 22 in this virtual-machine environment about operation content.

Moreover, in the second embodiment and the third embodiment, the client PC 3A (3) is designed to instruct each guest OS 22 in the virtual-machine environment about operation content. The client PC 3A (3) can be designed to instruct each guest OS 22 even in a real-machine environment where each server PC 2A (2) has the guest OS 22 installed. A fourth embodiment is described below with a computer system that instructs each server PC 2A (2) in a real-machine environment about operation content.

[d] Fourth Embodiment

FIG. 10 is a block diagram of the configuration of a computer system according to the fourth embodiment. The same components as those included in the virtual machine system 1 illustrated in FIG. 2 are denoted with the same reference numerals and the same description about the components and the operation is not repeated.

A computer system 1B illustrated in FIG. 10 includes a plurality of server PCs 2B and a client PC 3B. The OS control unit 16 of the server PC 2B manages the guest OS 22 and sends the operation screen for the guest OS 22 that is under the management of the OS control unit 16 to the client PC 3B via the screen providing unit 23A and the LAN 4.

The operation of the computer system 1B is described below according to the fourth embodiment. FIG. 11 is a flowchart of a guest-OS operation-content instructing process performed by the units included in the client PC 3B according to the fourth embodiment.

In the flowchart of FIG. 11, after the program is started at Step S11, the control unit 35 included in the client PC 3B sends a request for the operation screen for the guest OS 22 to each server PC 2B of the real machine (Step S12A). When the screen providing unit 23A included in the server PC 2B detects the operation-screen acquisition request coming from the LAN 4, the screen providing unit 23A collects the operation screen from the guest OS 22 that is under the management. After the operation screen from the guest OS 22 is collected, the screen providing unit 23A sends operation screen information that contains the operation screen for the guest OS 22 via the LAN 4 to the client PC 3B.

The control unit 35 determines whether the operation screen information about the guest OS 22 has been received from each server PC 2B (Step S13A). The process control goes to Step S14 and the screen control unit 52 included in the control unit 35 displays, in accordance with the operation screen information, the operation screen for each the guest OS 22 on the screen of the display unit 32.

The operation-content instructing unit 54 stores the guest name of each guest OS 22 and the operation content in the operation-content instruction-data storage unit 43 at Step S24 and then sends the master OS and operation-content instruction-data assigned to each guest OS 22 to the corresponding server PC 2B (Step S25A). The operation-content instructing unit 54 sends the operation-content instruction-data assigned to the master OS to the server PC 2B that manages the master OS and sends the operation-content instruction-data assigned to the guest OS 22 to the server PC 2B that manages the guest OS 22.

Moreover, when the operation-content instruction-data is sent to the server PC 2B and then the operation-content instructing unit 54 receives the next operation screen information from the server PC 2B (Step S26A), the process control goes to Step S14 and the operation screen for each guest OS 22 is displayed on the screen.

The operation-content instructing unit 54 stores the guest name of the guest OS 22 and the operation content in the operation-content instruction-data storage unit 43 during the individual operation mode at Step S29 and then sends operation-content instruction-data assigned to the guest OS 22 to the corresponding server PC 2B (Step S30A). The process control goes to Step S26A and the operation-content instructing unit 54 is ready to receive the next operation screen information from the server PC 2B.

In the fourth embodiment, even in the real-machine environment, when an instruction operation for the client PC 3B is detected on the operation screen for the master OS, a search is made amongst the other server PCs 2B for any sub OS that displays the operation screen that receives the same instruction operation that the operation screen for the master OS receives. Moreover, in the fourth embodiment, the master OS and each sub OS are instructed about operation content corresponding to the instruction operation that has been detected on the operation screen for the master OS. Therefore, even in the real-machine environment, the operating load on the operator is reduced remarkably by decreasing the number of instruction operations for causing two or more guest OSs 22 to perform the same operation content to one.

In the fourth embodiment, it is possible to perform some processing other than the OS installation processing in the real-machine environment, such as application installation processing and OS backup processing, under the control of the client PC 3B in response to an instruction operation that is made using the operation screen for the master OS. Some processing other than the OS installation processing include, for example, routine jobs such as OS and application batch processing and batch execution. The reason for considering some processing other than the OS installation processing is that, in the real-machine environment, the client PC is not connected to the guest OS 22 via the network until the OS is installed and then the network is built. In contrast, in the virtual-machine environment, because the host OS 23 can control the operation screen for the guest OS 22, the OS installation processing is executable.

The components illustrated can be physically configured in a manner different from the manner as illustrated. The components, as a whole or in part, can be separated or integrated either functionally or physically based on various types of loads or use conditions.

Figure 12:
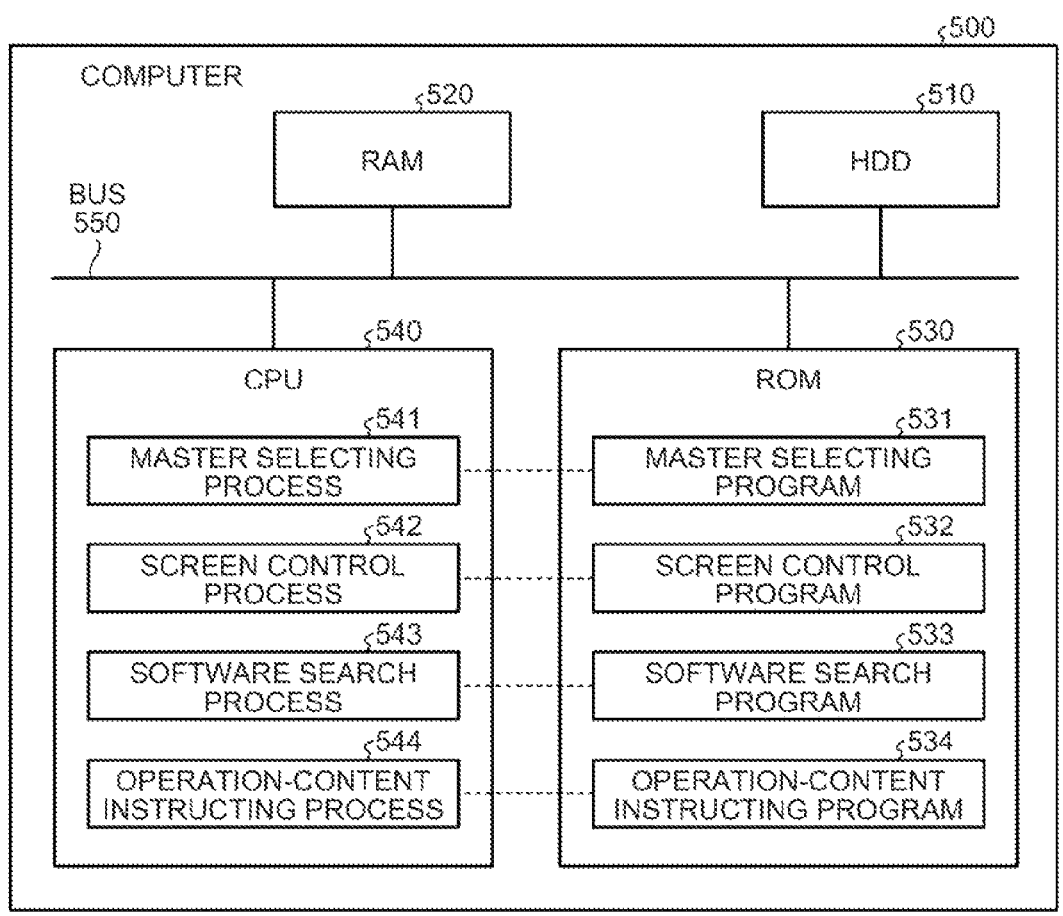
FIG. 12 is a block diagram of a computer that executes a software operation-content instructing program.
Figure 13:
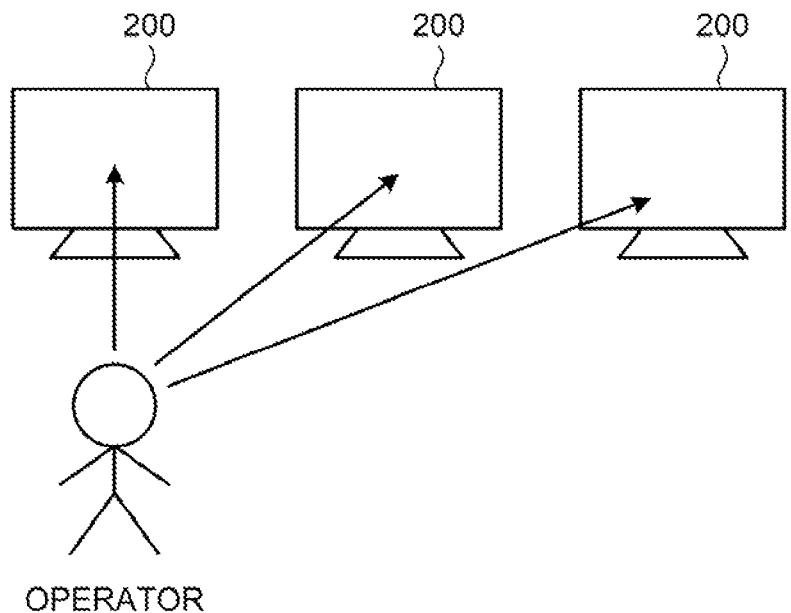
FIG. 13 is a schematic diagram that illustrates a conventional guest OS installation process in a real-machine environment.
Figure 14:
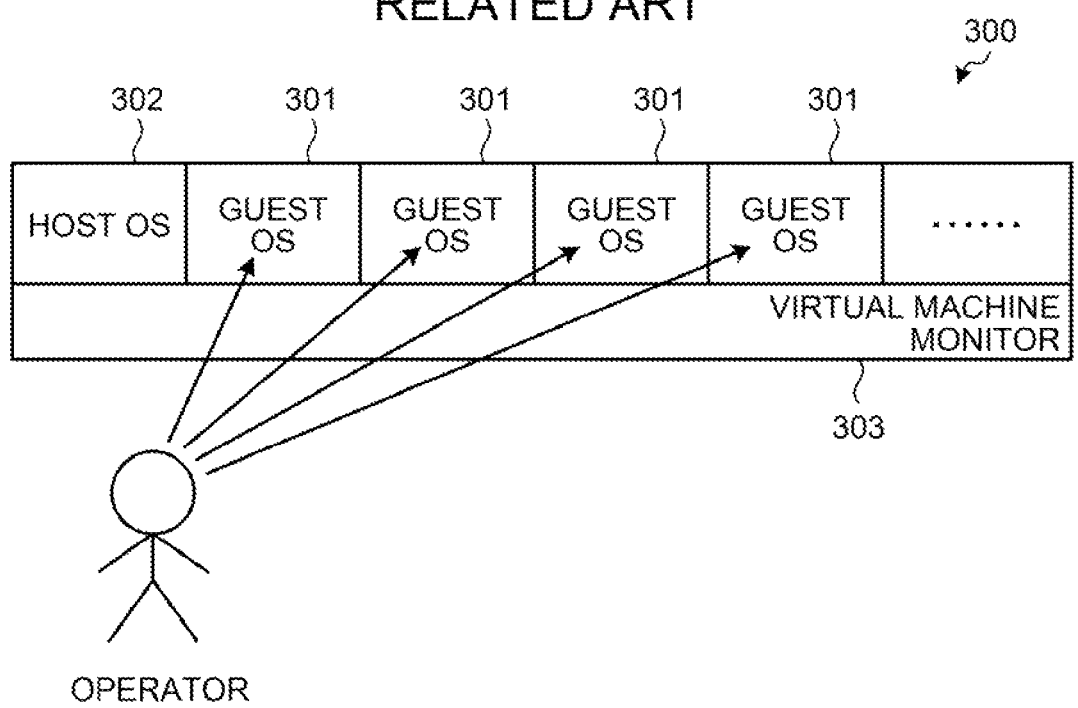
FIG. 14 is a schematic diagram that illustrates a conventional guest OS installation process in a virtual-machine environment.

The processes described in the present embodiment can be performed by executing predetermined programs using a computer. An example of a computer is described below with reference to FIG. 12 that executes a program for implementing the same functions as those of the above embodiments. FIG. 12 is a block diagram of a computer that executes a software operation-content instructing program.

As illustrated in FIG. 12, a computer 500 that executes the software operation-content instructing program includes a hard disk drive (HDD) 510, a RAM 520, a ROM 530, and a CPU 540, those connected to each other via a bus 550.

The ROM 530 prestores therein the software operation-content instructing program for implementing the same functions as those of the above embodiments, the software operation-content instructing program including, as illustrated in FIG. 12, a master selecting program 531, a screen control program 532, a software search program 533, and an operation-content instructing program 534. The computer programs 531 to 534 can be integrated together or separated individually as appropriately in the same manner as the components of the information terminal 100 that are illustrated in FIG. 1.

When the CPU 540 reads these computer programs 531 to 534 from the ROM 530 and executes them, these computer programs 531 to 534 function, as illustrated in FIG. 12, as a master selecting process 541, a screen control process 542, a software search process 543, and an operation-content instructing process 544, respectively. The processes 541 to 544 correspond to those units illustrated in FIG. 1 including the master selecting unit 111, the screen control unit 112, the software search unit 113, and the operation-content instructing unit 114, respectively.

The CPU 540 displays the operation screen for the selected master software on a screen. When an instruction operation is detected on the operation screen for the master software, the CPU 540 displays the operation screen that receives the same instruction operation that the operation screen for the master software receives. The CPU 540 instructs the master software and each piece of software that is found by the search about operation content corresponding to the instruction operation that has been detected on the operation screen for the master software. Each of the software and the master software performs a process in accordance with the operation content corresponding to the instruction operation.

Therefore, when the same instruction operation is made for two or more pieces of software, with only one instruction operation that is made using the operation screen for the master software, the operator of the computer 500 can instruct each piece of software about the same operation content corresponding to the instruction operation.

According to an embodiment of the information terminal disclosed in the present application, an instruction operation for instructing two or more pieces of software about the same operation content is simplified, which has the effect of reducing the operating load on the operator.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display terminal comprising:
a memory; and
a processor coupled to the memory,
wherein the processor executes a process comprising:
displaying a plurality of operation screens to each information processing apparatus thereto connected;
first receiving a selection of a master operation screen in the plurality of the operation screens;
second receiving a selection of a sub operation screen in the plurality of the operation screens, the sub operation screen corresponding to the master operation screen;
third receiving a setting of an operation mode in which an instruction operation to the master operation screen is notified to the sub operation screen; and
in the case of receiving the setting of the operation mode, first instructing the sub operation screen about the instruction operation to the master operation screen and nullifying the instruction operation to the sub operation screen,
wherein the first instructing includes:
comparing the master operation screen with the sub operation screen in the case of detecting the instruction operation on the master operation screen; and
identifying, in accordance with a comparison result obtained by the comparing and a position of the instruction operation that has been detected on the master operation screen, a relative position corresponding to the instruction operation on the sub operation screen, mapping to the relative position the instruction operation that has been detected on the master operation screen, and second instructing the sub operation screen about the instruction operation that has been detected on the master operation screen.

2. The display terminal according to claim 1,
wherein the first instructing includes displaying a nullification of the instruction operation in the case of nullifying the instruction operation to the sub operation screen.

3. The display terminal according to claim 1,
wherein the third receiving includes receiving a setting of an individual operation mode not to associate the instruction operation to the master operation screen with the instruction operation to the sub operation screen; and
the first instructing instructs the sub operation screen about the instruction operation to the sub operation screen in the case of receiving the setting of the individual operation mode.

4. The display terminal according to claim 1,
wherein, in a virtual-machine environment that includes the plurality of operation screens and a host software that controls the plurality of the operation screens, when the host software detects the instruction operation from the first instructing, the host software causes a corresponding software to perform a process corresponding to the instruction operation as the instruction operation of the sub operation screen.

5. The display terminal according to claim 4,
wherein the host software includes:
memorizing accessible operation screen in association with an identification information being information for identifying the display terminal, the display terminal being able to instruct the accessible operation screen about the instruction operation; and
acquiring, when detecting a request for access to a target operation screen from the display terminal, the identification information of the display terminal and determining whether the target operation screen is accordant with the accessible operation screen corresponding to the identification information of the target operation screen,
wherein the first instructing permits an access to the target operation screen from the display terminal in the case of determining that the target operation screen is accordant with the accessible operation screen, and the first instructing denies the access to the target operation screen from the display terminal in the case of determining that the target operation screen is not accordant with the accessible operation screen.

6. A displaying method of a display terminal displaying a plurality of operation screens to each information processing apparatus thereto connected, the displaying method comprising:
first receiving a selection of a master operation screen in the plurality of the operation screens;
second receiving a selection of a sub operation screen in the plurality of the operation screens, the sub operation screen corresponding to the master operation screen;
third receiving a setting of an operation mode in which an instruction operation to the master operation screen is notified to the sub operation screen; and
in the case of receiving the setting of the operation mode, first instructing the sub operation screen about the instruction operation to the master operation screen and nullifying the instruction operation to the sub operation screen,
wherein the first instructing includes:
comparing the master operation screen with the sub operation screen in the case of detecting the instruction operation on the master operation screen; and
identifying, in accordance with a comparison result obtained by the comparing and a position of the instruction operation that has been detected on the master operation screen, a relative position corresponding to the instruction operation on the sub operation screen, mapping to the relative position the instruction operation that has been detected on the master operation screen, and second instructing the sub operation screen about the instruction operation that has been detected on the master operation screen.

7. A computer-readable non-transitory recording medium storing a displaying program that causes a computer having a display for displaying a plurality of operation screens to each information processing apparatus thereto connected, to execute a process comprising:
- first receiving a selection of a master operation screen in the plurality of the operation screens;
- second receiving a selection of a sub operation screen in the plurality of the operation screens, the sub operation screen corresponding to the master operation screen;
- third receiving a setting of an operation mode in which an instruction operation to the master operation screen is notified to the sub operation screen; and
- in the case of receiving the setting of the operation mode, first instructing the sub operation screen about the instruction operation to the master operation screen and nullifying the instruction operation to the sub operation screen, wherein the first instructing includes:

comparing the master operation screen with the sub operation screen in the case of detecting the instruction operation on the master operation screen; and identifying, in accordance with a comparison result obtained by the comparing and a position of the instruction operation that has been detected on the master operation screen, a relative position corresponding to the instruction operation on the sub operation screen, mapping to the relative position the instruction operation that has been detected on the master operation screen, and second instructing the sub operation screen about the instruction operation that has been detected on the master operation screen.

* * * * *